US008368694B2

(12) United States Patent
Novosad

(10) Patent No.: US 8,368,694 B2
(45) Date of Patent: Feb. 5, 2013

(54) EFFICIENT RENDERING OF MULTIPLE FRAME BUFFERS WITH INDEPENDENT RAY-TRACING PARAMETERS

(75) Inventor: Justin Novosad, Montreal (CA)

(73) Assignee: AUTODESK, Inc, San Rafaelca (*) Notice: Subject to any disclaimer, the term of this patent is extended or adjusted under 35 U.S.C. 154(b) by 885 days.

(21) Appl. No.: 12/478,671

(22) Filed: Jun. 4, 2009

(65) Prior Publication Data

US 2010/0309205 A1    Dec. 9, 2010

(51) Int. Cl.
*G06T 15/50* (2011.01)
(52) U.S. Cl. ........................... 345/426; 345/545
(58) Field of Classification Search ................ 345/426, 345/545
See application file for complete search history.

(56) References Cited

U.S. PATENT DOCUMENTS

| | | | |
|---|---|---|---|
| 5,930,756 A | 7/1999 | Mackie et al. | |
| 6,664,961 B2 * | 12/2003 | Ray et al. | 345/424 |
| 6,819,325 B2 | 11/2004 | Boyd et al. | |
| 7,142,216 B2 | 11/2006 | Boyd et al. | |
| 7,218,291 B2 | 5/2007 | Abdalla et al. | |
| 7,233,332 B2 | 6/2007 | Lokovic et al. | |
| 7,463,259 B1 | 12/2008 | Kolb et al. | |
| 7,583,275 B2 | 9/2009 | Neumann et al. | |
| 2003/0002729 A1 * | 1/2003 | Wittenbrink | 382/154 |
| 2005/0080602 A1 | 4/2005 | Snyder et al. | |
| 2006/0055695 A1 | 3/2006 | Abdulla et al. | |
| 2007/0075998 A1 | 4/2007 | Cook et al. | |
| 2008/0028449 A1 | 1/2008 | Shigeeda et al. | |
| 2009/0128551 A1 | 5/2009 | Bakalash et al. | |
| 2009/0303247 A1 | 12/2009 | Zhang et al. | |
| 2009/0322751 A1 | 12/2009 | Oneppo et al. | |
| 2010/0073369 A1 | 3/2010 | McCombe et al. | |

OTHER PUBLICATIONS

Purcell "Ray Tracing on a Stream Processor" A dissertation submitted to the department of computer science and the committee on graduate studies of Stanford university in partial fulfillment of the requirements for the degree of doctor of philosophy, Mar. 2004, p. 95.*
Office Action, U.S. Appl. No. 12/197,190 dated Jul. 7, 2011.
Non-Final Office Action, U.S. Appl. No. 12/388,350, dated Nov. 1, 2011.
Non-Final Office Action, U.S. Appl. No. 12/388,361, dated Mar. 27, 2012.
Final Office Action, U.S. Appl. No. 12/197,190, dated Dec. 15, 2011.

* cited by examiner

*Primary Examiner* — Maurice L McDowell, Jr.
(74) *Attorney, Agent, or Firm* — Patterson & Sheridan, LLP

(57) ABSTRACT

One embodiment of the present invention sets forth a technique for rendering a plurality of images from a graphics scene in one rendering pass. Each image from the plurality of images may include or preclude certain scene objects and shading effects associated with the scene objects, as specified by a set of rules associated with a corresponding frame buffer that is configured to store the image. During the rendering pass, a ray-tracing application performs at least one complete ray casting operation, which is concluded according to the set of rules. At each stage in the ray casting operation, individual rules for each frame buffer determine whether results from that stage should be saved in the frame buffer. The plurality of images may represent different segments of a final rendered image, and may be combined arbitrarily in a compositing phase to generate the final rendered image.

22 Claims, 6 Drawing Sheets

EFFICIENT RENDERING OF MULTIPLE FRAME BUFFERS WITH INDEPENDENT RAY-TRACING PARAMETERS

BACKGROUND OF THE INVENTION

1. Field of the Invention

Embodiments of the present invention relate generally to rendering graphics images and more specifically to efficient rendering of multiple frame buffers with independent ray-tracing parameters.

2. Description of the Related Art

High-quality graphics rendering applications are commonly used to generate highly refined images, such as photorealistic graphics images, from mathematical models of three-dimensional (3D) graphics scenes. A graphics scene typically comprises scene objects with material properties, light sources with associated properties, camera positions, and other relevant data configured within a scene database of a modeling application. The modeling application conventionally generates a render database from the scene database. The high-quality rendering application traverses the render database to render a highly refined image from the graphics scene represented within the render database.

The high-quality graphics rendering application typically invokes a plurality of shaders, each configured to impart various physically and visually significant effects on objects within the graphics scene. A shaded pixel in a final image may comprise contributions, organized as contribution types, from the plurality of shaders. Each type of shader, such as a material shader, may generate shading results based on results from other shaders, such as lighting shaders. For example, a material shader may generate shading results for a pixel based on specular lighting and diffuse lighting for a point on a scene object, whereby each source of lighting is computed from a corresponding lighting shader. Each shader may save data for a corresponding contribution type in a separate frame buffer. A plurality of frame buffers may be combined in a compositing step to generate a final image.

Because the goal of rendering images with a high-quality rendering application is to produce final images to the highest technical and artistic standards, users oftentimes generate and store a plurality of rendered images, each including different scene segments for a given scene. Users can then perform adjustments to certain parameters of specific segments within the rendered images in order to optimize a given final image. For example, a user may adjust how bright a specular highlight appears on a certain object to establish an aesthetic relationship of the object to other scene objects. Such adjustments may be performed as part of a posterior compositing step used to generate final images by combining rendered images stored in corresponding frame buffers.

In order to generate the plurality of coherent rendered images in a set of corresponding frame buffers, high-quality rendering applications conventionally perform a render pass for each image within the plurality of rendered images. However, each render pass typically requires significant computation independent of specific shader computations. Therefore, superfluous computations are conventionally required within the high-quality rendering application to generate each additional rendered image, leading to inefficiency in the high-quality rendering application. Because the computational load related to a high-quality rendering application typically accounts for a majority of an overall computational load for a given rendered end product, this inefficiency can be very costly to users.

As the foregoing illustrates, what is needed in the art is a technique for improving efficiency in rendering multiple scene segments using high-quality rendering applications.

SUMMARY OF THE INVENTION

One embodiment of the present invention sets forth a computer-implemented method for rendering a plurality of pixels into a corresponding plurality of frame buffers for display. The method includes the steps of selecting a point to render within a viewport, where the point represents a common location for each pixel within the frame buffer corresponding to the pixel, initializing a plurality of data structures, where each data structure is associated with a different one of the frame buffers in the plurality of frame buffers, and attaching each data structure to a ray-trace state associated with the point. The method also includes the steps of casting a ray based on the ray-trace state to render shading results, storing the shading results in one or more compositing stacks residing within the data structures, generating one of more samples for each of the pixels based on the shading results, combining the one or more samples for each of the pixels to generate the plurality of pixels, and storing each pixel in the frame buffer corresponding to the pixel.

One advantage of the disclosed method is that sets of associated samples are generated and then combined to produce a plurality of pixels, which are stored in associated frame buffers. Importantly, with such an approach, each image stored in each frame buffer may be rendered within the same rendering pass, thereby improving overall processing efficiency.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
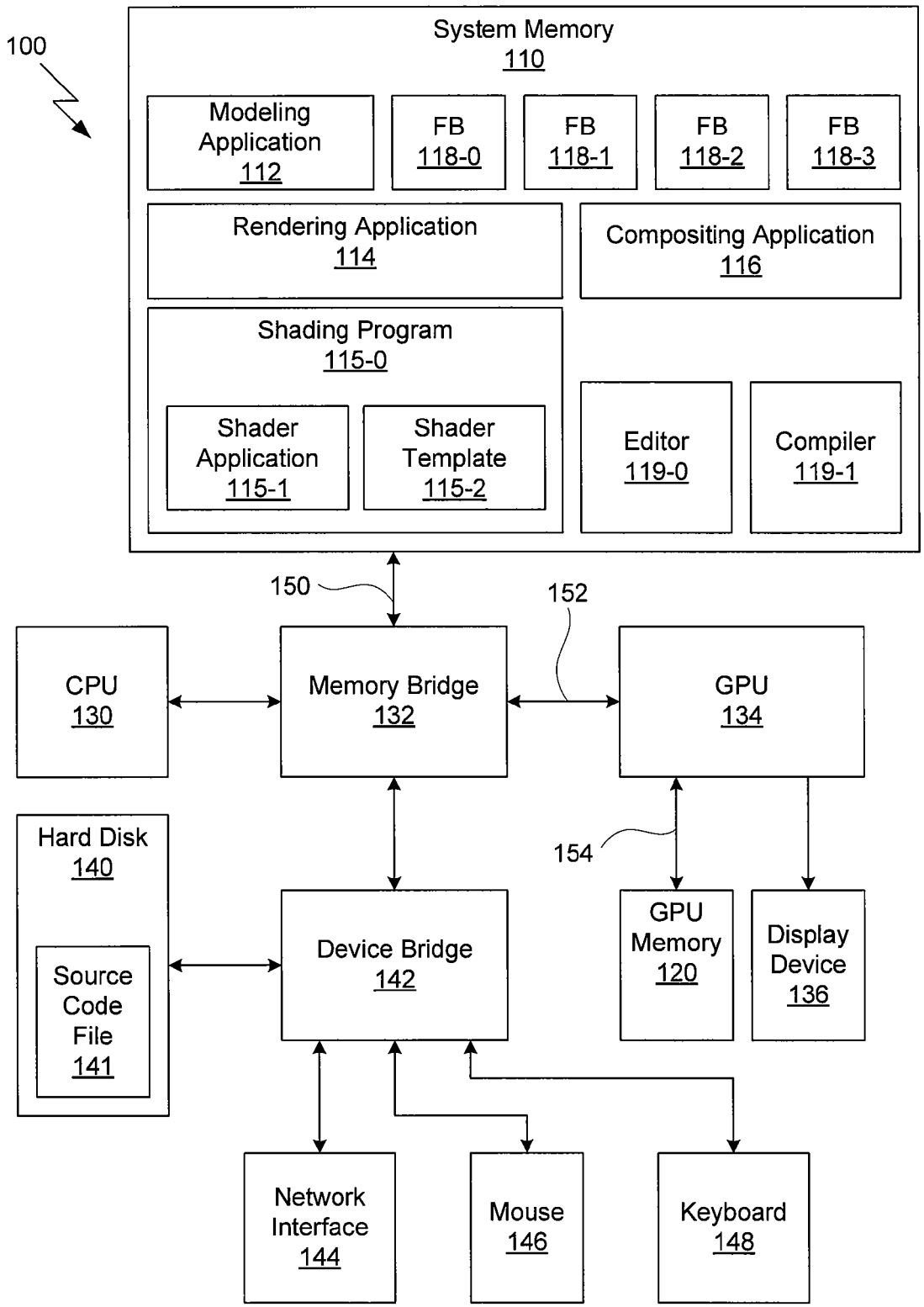
FIG. 1 illustrates a computer system configured to implement one or more aspects of the present invention.

FIG. 1 illustrates a computer system 100 configured to implement one or more aspects of the present invention. The computer system 100 includes, without limitation, a central processing unit (CPU) 130, a system memory 110, a graphics processing unit (GPU) 134, a GPU memory 120, a memory bridge 132, a display device 136, a hard disk 140, a device bridge 142, a network interface 144, a mouse 146, and a keyboard 148.

The CPU 130 communicates with the system memory 110 via the memory bridge 132, which may be, e.g., a Northbridge device or subsystem. System memory 110 is configured to store application programs, as well as data used by or generated by the CPU 130. System memory 110 is coupled to the memory bridge 132 via a system memory bus 150. The memory bridge 132 is coupled to the GPU 134 via a GPU system bus 152. The GPU system bus 152 may comprise any technically feasible data interconnect, such as the well known personal computer interconnect (PCI) express bus. The memory bridge 132 is also coupled to the device bridge 142 using an interconnect system such as PCI. The GPU 134 conventionally incorporates real time image rendering means for rendering both three-dimensional (3D) and two-dimensional (2D) images. The GPU 134 delivers pixel data to display device 136, which may comprise a conventional CRT or LCD display. The GPU 134 is coupled to the GPU memory 120 using a GPU memory bus 154. The GPU memory 120 may be configured to store data used by or generated by the GPU 134. Data stored within the GPU memory 120 passes through the GPU 134 and the memory bridge 132 when accessed by the CPU 130. In some embodiments, the integrated circuit implementing the CPU 130 may incorporate additional functional blocks, such as the memory bridge 132 and the device bridge 142. In alternative embodiments, the integrated circuit implementing the GPU 134 may incorporate additional functional blocks, such as the memory bridge 132 and the device bridge 142.

The device bridge 142 is coupled to a hard drive 140, a network interface 144, a mouse 146, and a keyboard 148. The hard drive 140 provides mass storage of programs and data. The network interface 144 provides network connectivity to other computers using a local area network (LAN) interface using any suitable technology, such as Ethernet. The mouse 146 and keyboard 148 provide user input. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, Quick Path Interconnect, or any other bus or point-to-point communication protocol(s), and connections between different devices may use different protocols as is known in the art.

In one embodiment, system memory 110 is configured to store a graphics modeling application 112, a graphics rendering application 114, a compositing application 116, an editor 119-0, and a compiler 119-1. The graphics rendering application 114 should include at least one shader module. The shader module may communicate with the rendering engine using any technically feasible means, such as a rendering application programming interface (API). System memory 110 is also configured to store a plurality of frame buffers 118, which may be configured to store scene segments rendered by the rendering engine, and an image generated by the compositing application 116. The compositing application 116 combines segments according to a contribution value for each segment to generate a composite image. For example, the rendering application 114 may render segments stored in frame buffers 118-0 through 118-2, and the compositing application 116 may combine the segments to generate a composite image, such as a final image, stored in frame buffer 118-3. The rendering application 114 uses shader functions within a customized shader program 115-0 to compute color samples, such as color, transparency, and other aspects of pixels or fragments in a graphics scene.

The editor 119-0 is used to generate and modify source code files stored in persistent memory, such as on the hard disk 140. The compiler 119-1 is configured to read in and parse certain source code files to generate, or "compile" executable code. For example, the editor 119-0 may be used to modify source code file 141 and the compiler 119-1 may compile source code file 141 to generate the customized shading program 115-0. The customized shading program 115-0 should be compiled to include housekeeping functionality for shading operations embodied in a shader application 115-1, and specific shading functions included in a shader template 115-2. The source code file 141 may include a source code representation of the shader template 115-2 and related shader modules. The rendering application 114 may be coupled to the customized shading program 115-0 to incorporate modifications made by the editor 119-0. In one embodiment the customized shading program 115-0 is incorporated into the rendering application 114.

In an alternative embodiment, a first computer system includes a modeling application, and may include a compositing application. Additionally, a set of one or more computer systems may include at least one instance of the rendering application. In this scenario, the set of one or more computer systems is configured to communicate via a computer network. In this embodiment, the first computer system includes software configured to cause each computer system in the set of one or more computer systems to independently render and store scene segments.

Figure 2:
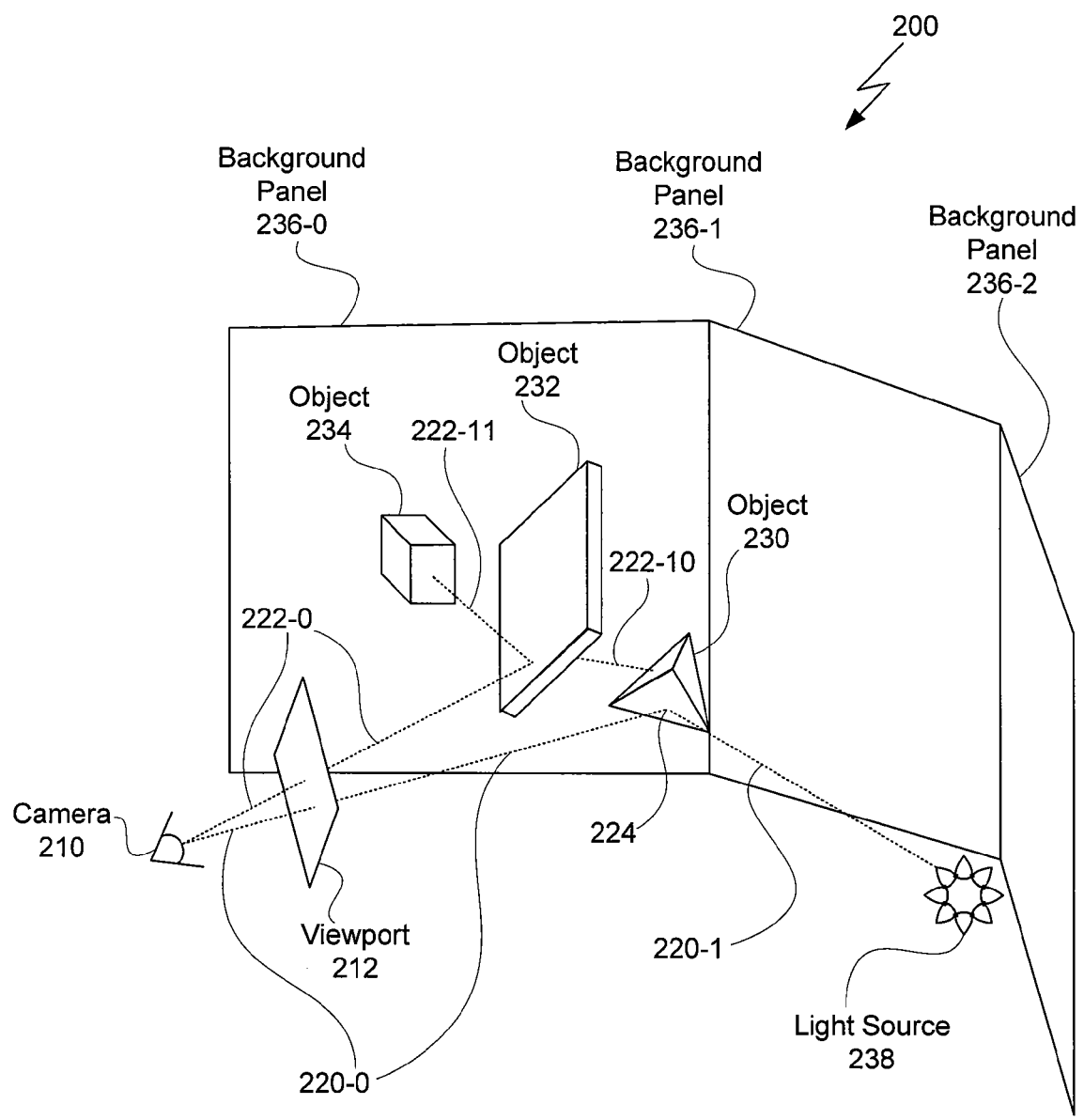
FIG. 2 illustrates a three-dimensional graphics scene, according to one embodiment of the invention.

FIG. 2 illustrates a three-dimensional graphics scene 200. The graphics scene 200 includes geometric objects such as background panels 236, object 230, object 232, and object 234. Graphics scene 200 may also includes one or more light source 238. A camera 210 and an associated camera position establish a viewport 212 into graphics scene 200. The viewport 212 comprises a two-dimensional array of pixels, each serving as a sample point of the graphics scene 200. Each pixel may comprise one or more sub-pixel samples. Persons skilled in the art will recognize that rendering the graphics scene 200 may be accomplished using ray-tracing, a well known technique.

To compute a color of a pixel in the viewport 212, at least one eye ray 220-0 is projected from the camera 210, through the pixel sample in the viewport 212, and into the graphics scene 200 until the eye ray 220-0 intersects with an object within the graphics scene 200. The location of the camera 210 comprises a ray starting point for the eye ray 220-0. A spatial location for the corresponding pixel in the viewport 212, in combination with the ray starting point, establishes an eye ray direction into the graphics scene. In this scenario, the eye ray 220-0 intersects object 230 at eye ray intersection 224 on the surface of object 230. Each intersection comprises a new starting point, and object geometry and material properties determine a ray direction for a subsequently cast ray. In this scenario, the light ray 220-1 is traced from light source 238, potentially imparting various forms of illumination from light source 238 on object 230 at the eye ray intersection 224. Each pixel of the viewport 212 is similarly sampled by projecting a corresponding eye ray from the camera 210 through the viewport 212. Persons skilled in the art will recognize that multiple samples may be generated and combined to generate each pixel in viewport 212.

Other objects in the graphic scene 200 may include a plurality of well known and custom attributes. For example, object 232 may be semi-transparent and semi-reflective (such as a piece of glass), and therefore include attributes describing transparency properties and reflectivity properties. Eye ray 222-0 may reflect off a surface of object 232 and intersect with object 234 along ray 222-11. Eye ray 222-0 may also refract through object 232 and continue along ray 222-10 until intersecting object 230. Importantly, object 230 may be visible via a plurality of paths, each involving different material properties and different shaders.

In one usage scenario of the invention, a user may wish to generate a scene segment including, for example, only object 230 in isolation regardless of projection paths from camera 210, or only reflections of object 234, or only portions of graphics scene 200 that include a certain minimum level of refraction. Importantly, each attribute of each item within graphic scene 200 may be used to determine if a given ray intersection and associated shading operations should be included in a particular frame buffer. As each ray intersection is computed in the graphic scene 200, associated shader results are selectively stored within a plurality of compositing stacks stored within a corresponding set of frame buffer state structures. A decision to selectively store a certain shader result in a specific compositing stack within a particular frame buffer state structure is based on a compositing rule set specified by the user. Each compositing rule set specifies which scene elements and shading effects are then represented in a rendered image stored in an associated frame buffer. A termination rule set may be generated according to a combination of compositing rule sets and, optionally, additional user rules.

After each ray cast operation is completed for a given pixel location in the viewport 212, each compositing stack includes independently stored shading data needed to generate a corresponding pixel in each frame buffer. For a given pixel within viewport 212, a ray cast operation is completed once no further ray casts are needed to compute the pixel value. However, because each frame buffer may include different sets of requirements, efficient completion of a given ray cast operation should be determined by a termination rule set that accommodates each compositing rule set. For example, one frame buffer state structure may specify a compositing rule set requiring only first incident eye rays 220-0, 222-0. This first compositing rule set only stores shading results from first incident eye rays to compute a pixel value for a first associated frame buffer. Any additional ray casting beyond first incident rays with respect to this first frame buffer is therefore superfluous. At the same time, a second frame buffer state structure may specify a compositing rule set requiring all ray casts up to a depth of five trace levels. This second compositing rule set would include first incident rays 220-0 and 222-0, as well as rays 222-11, 222-10, 220-1, and any other rays cast meeting other compositing rules up to a depth of five trace levels. In this scenario, a termination rule set should accommodate completing computations associated with rays 222-10 and 222-11, and any other rays up to a depth of five trace levels, prior to ending computation associated with eye ray 222-0. Importantly, the termination rule set determines when a ray cast operation is complete and, separately, each compositing rule set determines which results should be stored in a respective compositing stack.

Figure 3:
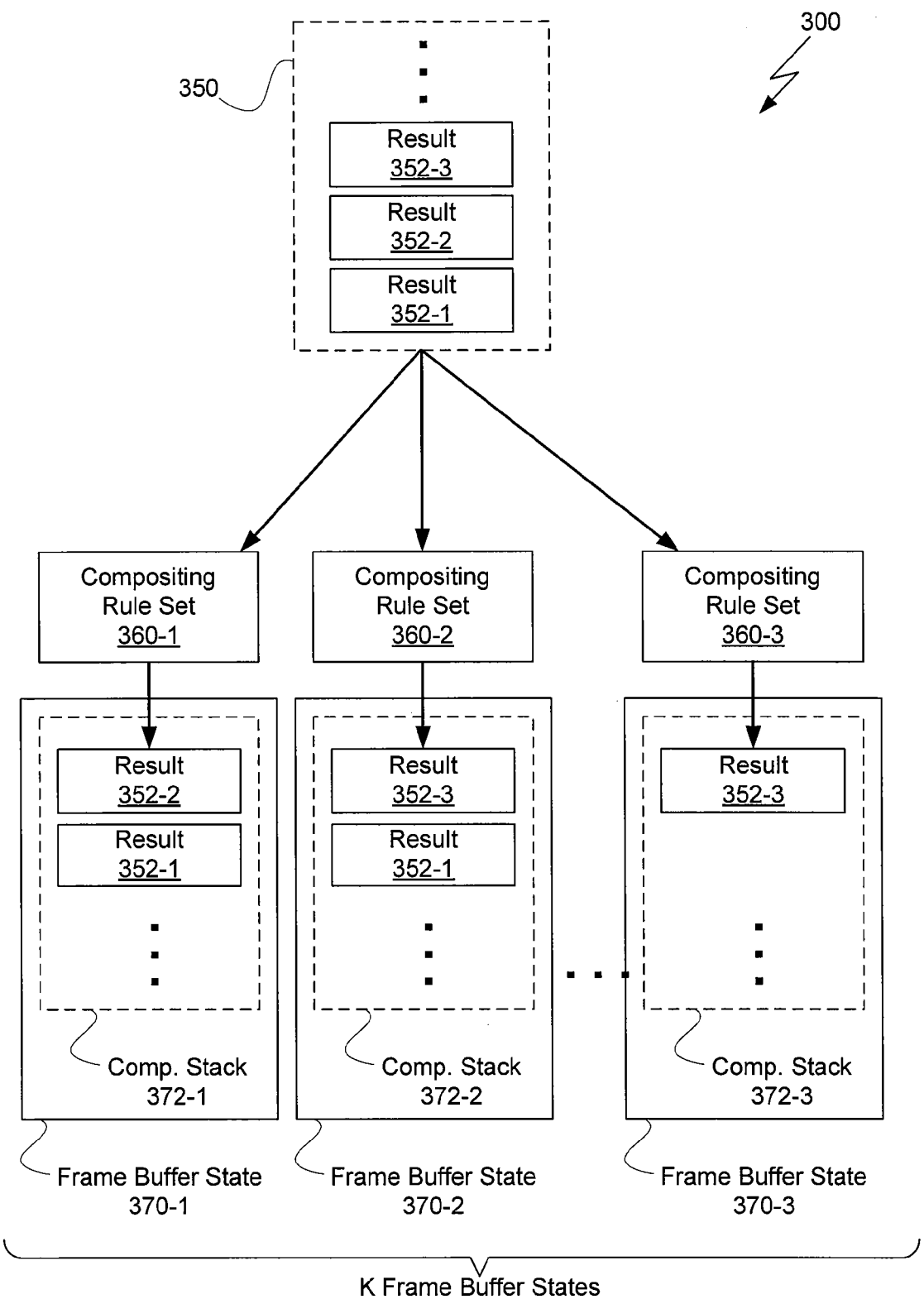
FIG. 3 illustrates data flow of shader results within a ray-tracing application, according to one embodiment of the invention.

FIG. 3 illustrates data flow 300 of shader results 350 within a ray-tracing application, according to one embodiment of the invention. During normal operation, the ray-tracing application, such as rendering application 114, casts rays starting from the camera 210 of FIG. 2 and progressing along a path including intersections between rays and objects. The path is defined by interactions between the rays and object material properties and geometry. At each intersection, the ray-tracer may invoke one or more shaders, which may compute individual shading results 352 at the intersection. Individual shading results 352 may include, for example, lighting effects, texturing effects, reflections, refraction, and the like. The user may associated certain attributes with each item in a scene, including which shaders should operate on the item, and which frame buffer should receive results from the shader, according to compositing rules specified for the frame buffer. At each intersection any reflection, refraction, or other child ray is also computed. Each child ray is recursively computed until termination rules terminate further recursion.

At each intersection, individual shading results 352 may or may not be added to a given compositing stack 372, as determined by an associated compositing rule set and, potentially, the termination rule set. A compositing rule set 360 for each frame buffer state 370 determines whether a given result 352 should be stored in a corresponding compositing stack 372 within a frame buffer state 370. For example, compositing rule set 360-1 may be used to determine which of individual shading results 352 should be stored in compositing stack 371-1. As shown, individual shading results 352-1 and 352-2 are stored in compositing stack 371-1, whereas individual shading results 352-1 and 352-3 may be stored in compositing stack 372-2. Only individual shading results 352-3 is stored in compositing stack 372-3. In this scenario, only results 352-2 and 352-1 are used to compute a corresponding pixel in a frame buffer associated with frame buffer state 370-1, and only result 352-3 is used to compute a corresponding pixel in a frame buffer associated with frame buffer state 370-3. This mechanism of using arbitrary compositing rule sets to determine which shading results are used to compute pixel values in individual frame buffers may be used to efficiently generate a plurality of highly-specific scene segments in one rendering pass.

A given compositing rule set may use object visibility within a scene, illumination sources, or certain ray-tracing options to determine whether a given shading result should be stored in a corresponding compositing stack. Shading attributes from ray-tracing that may be used to determine whether a given set of shading results should be stored in the corresponding compositing stack include transparency, holdouts, refraction levels, reflection levels, shadow casting, and whether invisible objects: cast shadows, produce reflections, produce refractions, are visible in reflections, or are visible in refractions. Thresholds for certain shading attributes may be used, including a minimum threshold for the refraction level, a minimum threshold for the reflection level, a maximum threshold for the refraction level, a maximum threshold for the reflection level, or a maximum global trace level.

Figure 4:
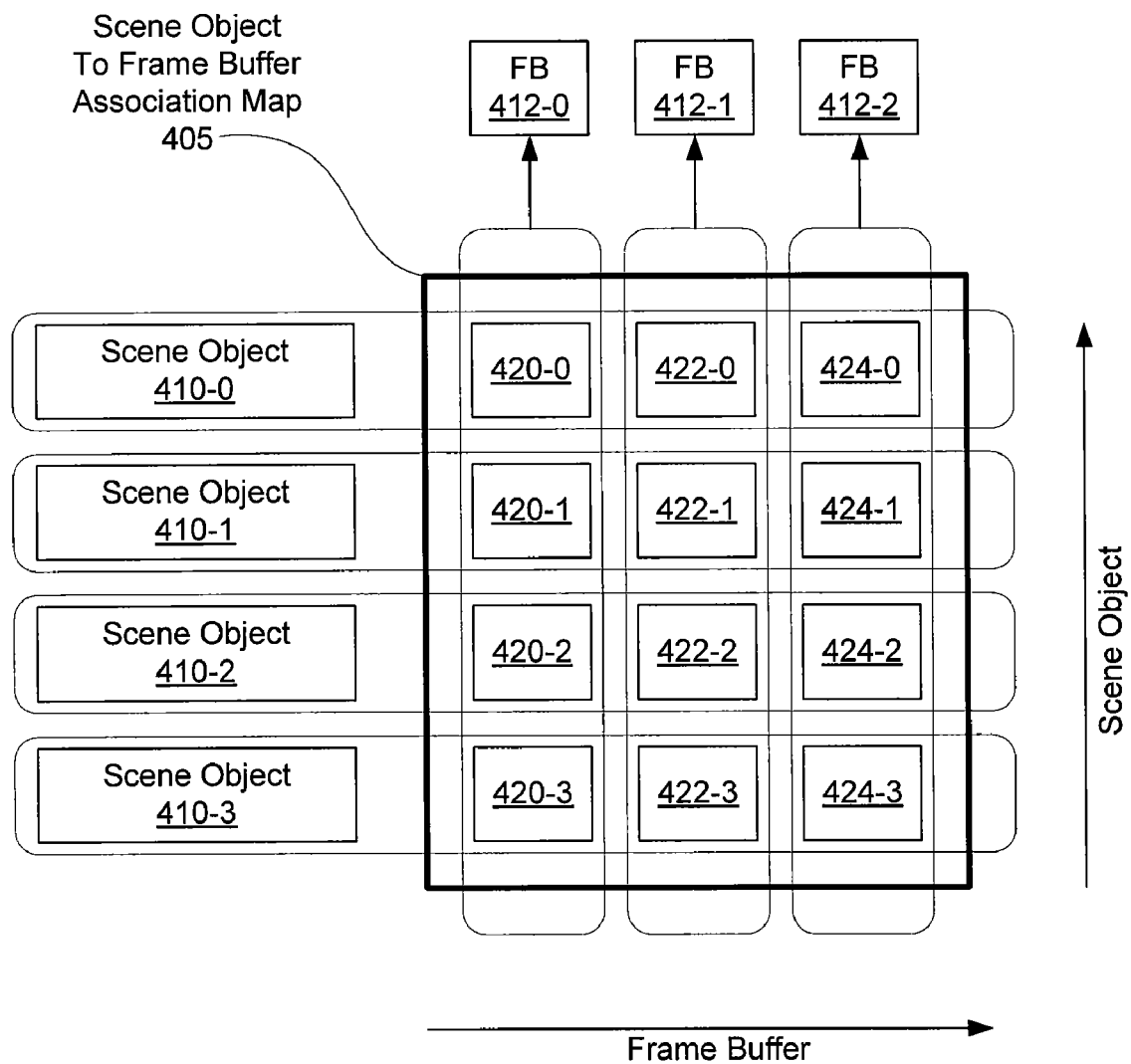
FIG. 4 illustrates exemplary associations between scene objects and frame buffers, according to one embodiment of the invention.

FIG. 4 illustrates exemplary associations between scene objects 410 and frame buffers 412, according to one embodiment of the invention. A user may wish to render certain scene objects 410 to explicitly specified frame buffers 412. A scene object to frame buffer association map 405 comprises one convenient structure for users to specify which scene object 410 should be rendered into (contribute to) one or more frame buffers 412. For example, a user may specify that only scene object 410-0 should be rendered into frame buffer 412-0, and that only scene object 410-1 should be rendered into frame buffer 412-1. The user may further specify that scene objects 410-0 through 410-2 should be rendered into frame buffer 412-2. Scene object 410-3 may remain invisible if the scene object to frame buffer association map 405 does not map to any frame buffer 412.

Figure 5A:
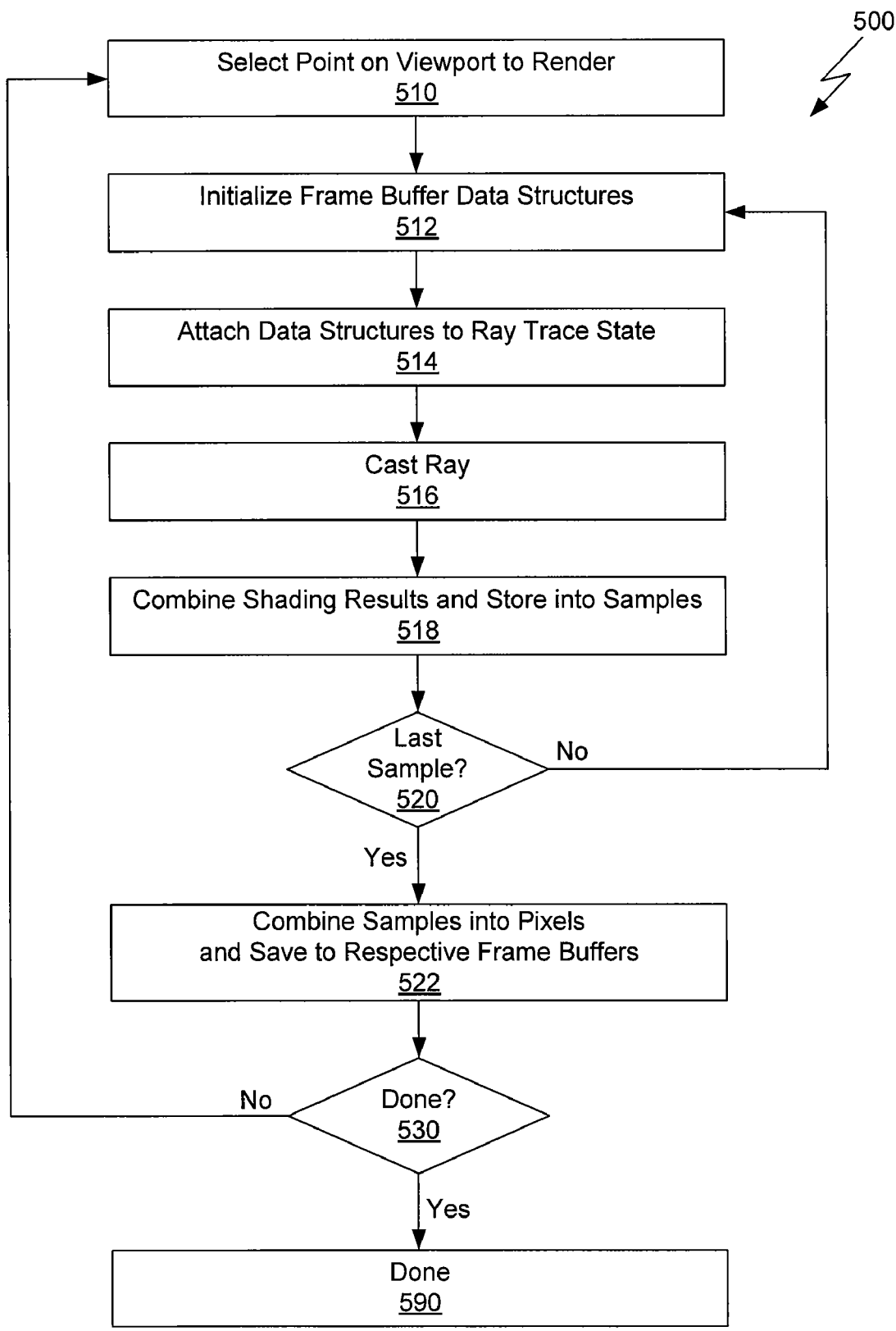
FIG. 5A is a flow diagram of method steps for performing ray-tracing with multiple, independent frame buffers, according to one embodiment of the invention.

FIG. 5A is a flow diagram of method steps 500 for performing ray-tracing with multiple, independent frame buffers, according to one embodiment of the invention. Although the method steps are described in conjunction with the systems of FIGS. 1, 3, and 4, persons skilled in the art will understand that any system configured to perform the method steps, in any order, is within the scope of the invention.

The method begins in step 510, where a ray-tracing application selects a point on a viewport, such as viewport 212 of FIG. 2, to render. Selecting a point may, for example, comprise performing a progressive raster scan of pixels within the viewport. In step 512, one or more frame buffer data structures are initialized. Each frame buffer should include a pixel corresponding to the selected point, and each frame buffer should comprise a resolution corresponding to the viewport 212. Each frame buffer data structure should include a frame buffer state, such as a frame buffer state 370 of FIG. 3, and an associated compositing rule set, such as a compositing rule set 360. Each compositing stack within each frame buffer state should be initialized in preparation for new shading result values. In one embodiment, the compositing stack comprises a fixed-size array of entries, with a valid entry variable indicating which entries within the array are valid. The valid entry variable may be cleared during initialization to indicate the compositing stack is empty. In step 514, the frame buffer data structures are attached to a ray-trace state for a pending ray within the ray-tracing application. By augmenting the ray-trace state to include independent compositing stacks associated with independent frame buffers to separately store compositing results, the ray-tracing application is able store shading results in each independent frame buffer according to compositing rules for the frame buffer. In this way, the ray-tracing application may render different scene segments in each frame buffer.

In step 516, the ray-tracing application casts a ray corresponding to the selected point on the viewport. This step, illustrated in greater detail in FIG. 5B, populates the compositing stack with shading results. In step 518, the ray-tracing application combines shading results for each compositing stack to generate and store a set of samples, corresponding to the shading results in each compositing stack. Each compositing stack and each corresponding sample is associated with a frame buffer. Each set of shading results may be combined using any technically feasible technique. For example, each shading result entry within the compositing stack may be combined based on back to front composition techniques, where the most recent compositing stack entry corresponds to the backmost item for compositing and the least recent compositing stack entry corresponds to the front most item for compositing. A similar front to back compositing means may also be used. In both cases, sequential shading results are blended together based on transparency attributes of each shading result. Importantly, only shading results that satisfy an associated compositing rule set are present in a particular compositing stack. In this way, only desired objects and effects are represented by shading results stored in the compositing stack. In one embodiment, a set of samples is stored within a frame buffer state associated with the frame buffer. If, in step 520, the sample is not the last sample associated with a pixel in the viewport, then the method proceeds to step 512. Each pixel in a frame buffer may comprise multiple samples, and each sample may be computed by casting a ray. Each sample, computed according to an associated compositing rule set, should be offset within a given pixel geometry in the viewport to effect a spatial sampling of the graphics scene. The samples comprising the spatial sampling are used to generate an anti-aliased pixel, which may be saved to a respective frame buffer.

Returning to step 520, if the current sample is the last sample associated with a pixel in the viewport, then the method proceeds to step 522, where the ray-tracing application combines the samples into pixels and saves each pixel to a respective frame buffer. If, in step 530, the last required ray is cast then rendering is done and the method terminates in step 590.

Returning to step 530, if the last required ray is not cast, then rendering is not done and the method proceeds to step 510.

Figure 5B:
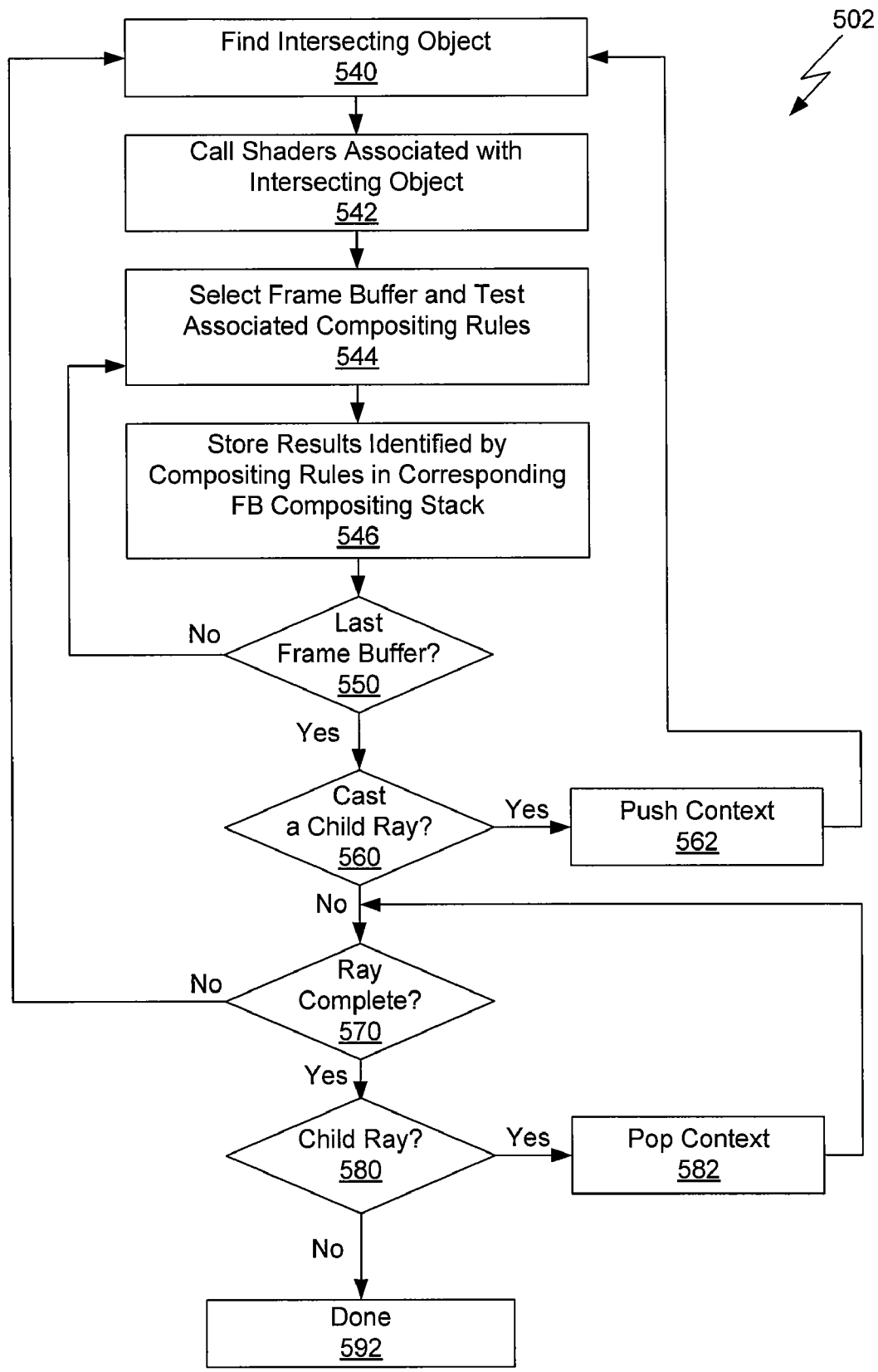
FIG. 5B is a flow diagram of method steps for casting a ray and selectively storing shader results in a plurality of compositing stacks, according to one embodiment of the invention.

FIG. 5B is a flow diagram of method steps 502 for casting a ray and selectively storing shader results in a plurality of compositing stacks, according to one embodiment of the invention. Again, the method of FIG. 5B is a more detailed account of step 516 of FIG. 5A. Although the method steps are described in conjunction with the systems of FIGS. 1, 3, and 4, persons skilled in the art will understand that any system configured to perform the method steps, in any order, is within the scope of the invention.

The method begins in step 540, where the ray-tracing application receives a ray and computes an intersecting object for the ray. A new ray cast may begin with an eye ray projected from the camera 210 of FIG. 2 through the viewport 212, such as eye ray 220-0 or 222-0. The intersecting object should be the first object encountered by following a ray cast. For example, object 230 is the first object encountered by eye ray 220-0, and therefore is the intersected object for eye ray 220-0. A point at which the cast ray intersects an object is an intersection point, such as eye ray intersection 224.

In step 542, the ray-tracing application calls one or more shaders associated with the intersecting object to compute shader results for the intersection point. The shaders may compute material properties, lighting properties, reflection properties, refraction properties, or any other technically feasible rendering attribute. The one or more shaders may be called in response to certain attributes for the intersecting object, and certain shading requirements specified by compositing rules for the frame buffers. Each object should include a set of attributes specifying which shaders should be called to render a sample corresponding to an intersection point on the object. The set of attributes may additionally specify shading parameters for the object used by shaders specified for the object. For example, object transparency may be specified as a shading parameter. Each shader may use related parameters in shading intersection points on the object.

In step 544, the ray-tracing application selects a frame buffer and tests associated compositing rules to determine which, if any, shading results should be stored in the frame buffer compositing stack. In step 546, the ray-tracing application stores shading results identified by compositing rules in a corresponding frame buffer compositing stack. If, in step 550, results for the last frame buffer were not yet processed, then the method proceeds to step 544.

Returning to step 544, if results for the last frame buffer were processed, then the method proceeds to step 560. If, in step 560, the ray-tracing application needs to cast a child ray, then the method proceeds to step 562. Persons skilled in the art will recognize that certain ray-tracing conditions may require recursively casting child rays. For example, when a semi-transparent, semi-reflective object is the intersected object. Reflections are rendered by casting a child ray along a path of reflection, while transparencies are rendered by casting a ray along a refraction path. Because a child ray may require further child rays, the process may be viewed as recursive. After a relatively small number of reflections (levels), the visual significance of each further reflection is highly limited. In fact, ten levels is generally adequate for most ray-tracing applications. In step 562, the ray-tracing application pushes a current ray-tracing context into a context data structure in preparation for casting a child ray. In one embodiment, the process of casting a child ray substantially replicates method steps 502 as a recursive process. At each recursive level, shading results may be placed in one or more compositing stack, according to corresponding compositing rules. Persons skilled in the art will recognize that this step is analogous to performing a recursive function call. Upon completing step 562, the method proceeds to step 540 to begin processing a new child ray using a new ray-tracing context for the child ray.

Returning to step 560, if the ray-tracing application does not need to cast a child ray, then the method proceeds to step 570. If, in step 570, ray-tracing for a sample in progress is not complete, then the method proceeds to step 540.

Returning to step 570, if ray-tracing for the sample in progress is complete, then the method proceeds to step 580. If, in step 580, the current ray is not a child ray, then the method terminates in step 592.

Returning to step 580, if the current ray is a child ray, then the method proceeds to step 582, where a ray-tracing context is popped from the context data structure to return ray-tracing context to the parent of the current child ray. The compositing stacks are popped and the frame buffer contributions registered by the child ray are composited into those of the parent ray. Persons skilled in the art will recognize this step as being analogous to returning from a recursive function call. Upon completing step 582, the method proceeds to step 570.

In sum, a technique is disclosed for generating a plurality of images using ray-tracing to render certain aspects of a graphic scene. Each image represents a scene segment, comprising a specified set of objects and shading attributes for the objects. Each image comprises a set of pixels, which may, in turn, comprise a plurality of samples. As the ray-tracing application casts individual rays through the graphics scene, shading results are accumulated in a plurality of compositing stacks, according to a set of compositing rules. The shading results in the plurality of compositing stacks are combined to generate a plurality of associated samples, each with an associated frame buffer. Sets of associated samples are combined to generate a plurality of pixels, which may be stored in associated frame buffers. Importantly, each image stored in each frame buffer is rendered within the same rendering pass, improving overall efficiency.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

I claim:

1. A computer-implemented method for rendering a plurality of pixels into a corresponding plurality of frame buffers for display, the method comprising:

selecting a point to render within a viewport, wherein the point represents a common location for each pixel within the frame buffer corresponding to the pixel;

initializing a plurality of data structures, wherein each data structure is associated with a different one of the frame buffers in the plurality of frame buffers;

attaching each data structure to a ray-trace state associated with the point;

casting a ray based on the ray-trace state to render shading results;

storing the shading results in one or more compositing stacks residing within the data structures according to a compositing rule set specified for each one of the frame buffers in the plurality of frame buffers;

generating one or more samples for each of the pixels based on the shading results;

combining the one or more samples for each of the pixels to generate the plurality of pixels; and storing each pixel in the frame buffer corresponding to the pixel.

2. A computer-implemented method for rendering a plurality of pixels into a corresponding plurality of frame buffers for display, the method comprising:

selecting a point to render within a viewport, wherein the point represents a common location for each pixel within the frame buffer corresponding to the pixel;

initializing a plurality of data structures, wherein each data structure is associated with a different one of the frame buffers in the plurality of frame buffers;

attaching each data structure to a ray-trace state associated with the point;

casting a ray based on the ray-trace state to render shading results;

storing the shading results in one or more compositing stacks residing within the data structures;

generating one or more samples for each pixel comprising blending the shading results stored in the one or more compositing stacks residing within the data structure associated with the pixel according to a sequential order;

combining the one or more samples for each of the pixels to generate the plurality of pixels; and storing each pixel in the frame buffer corresponding to the pixel.

3. The method of claim 2, wherein the step of casting a ray comprises performing a first ray cast operation through the point and into a graphics scene to determine a first intersecting object.

4. The method of claim 3, wherein the step of casting a ray further comprises invoking at least one shader associated with the first intersecting object to render a first set of shading results, wherein the shader is associated with the first intersecting object based on a set of compositing rules.

5. The method of claim 4, further comprising the step of pushing a first ray-tracing context associated with the first ray casting operation onto a memory stack.

6. The method of claim 5, wherein the step of casting a ray comprises determining that a child ray should be cast and performing a second ray cast operation from the first intersecting object to a second intersecting object within the graphics scene to determine a second intersecting object.

7. The method of claim 6, wherein the step of casting a ray further comprises invoking at least one shader associated with the second intersecting object to render a second set of shading results, wherein the shader is associated with the second intersecting object based on the set of compositing rules.

8. The method of claim 7, further comprising the step of pushing a second ray-tracing context associated with the second ray cast operation onto the memory stack.

9. The method of claim 8, further comprising the steps of determining that the second ray casting operation is complete and popping the second ray-tracing context from the memory stack.

10. The method of claim 9, further comprising the steps of determining that the first ray trace operation is complete and popping the first ray-tracing context from the memory stack.

11. A computer-implemented method for rendering a plurality of pixels into a corresponding plurality of frame buffers for display, the method comprising:
selecting a point to render within a viewport, wherein the point represents a common location for each pixel within the frame buffer corresponding to the pixel;
initializing a plurality of data structures, wherein each data structure is associated with a different one of the frame buffers in the plurality of frame buffers and includes metadata that determines how data stored in the frame buffer associated with the data structure is generated and processed;
attaching each data structure to a ray-trace state associated with the point;
casting a ray based on the ray-trace state to render shading results;
storing the shading results in one or more compositing stacks residing within the data structures;
combining the one or more samples for each of the pixels to generate the plurality of pixels; and
storing each pixel in the frame buffer corresponding to the pixel.

12. A non-transitory computer-readable storage medium including instructions that, when executed by a processing unit, cause the processing unit to render a plurality of pixels into a corresponding plurality of frame buffers for display, by performing the steps of:
selecting a point to render within a viewport, wherein the point represents a common location for each pixel within the frame buffer corresponding to the pixel;
initializing a plurality of data structures, wherein each data structure is associated with a different one of the frame buffers in the plurality of frame buffers;
attaching each data structure to a ray-trace state associated with the point;
casting a ray based on the ray-trace state to render shading results;
storing the shading results in one or more compositing stacks residing within the data structures according to a compositing rule set specified for each one of the frame buffers in the plurality of frame buffers;
generating one of more samples for each of the pixels based on the shading results;
combining the one or more samples for each of the pixels to generate the plurality of pixels; and
storing each pixel in the frame buffer corresponding to the pixel.

13. A non-transitory computer-readable storage medium including instructions that, when executed by a processing unit, cause the processing unit to render a plurality of pixels into a corresponding plurality of frame buffers for display, by performing the steps of:
selecting a point to render within a viewport, wherein the point represents a common location for each pixel within the frame buffer corresponding to the pixel;
initializing a plurality of data structures, wherein each data structure is associated with a different one of the frame buffers in the plurality of frame buffers;
attaching each data structure to a ray-trace state associated with the point;
casting a ray based on the ray-trace state to render shading results;
storing the shading results in one or more compositing stacks residing within the data structures;
generating one or more samples for each of the pixels comprising blending the shading results stored in the one or more compositing stacks residing within the data structure associated with the pixel according to a sequential order;
combining the one or more samples for each of the pixels to generate the plurality of pixels; and
storing each pixel in the frame buffer corresponding to the pixel.

14. The non-transitory computer-readable storage medium of claim 13, wherein the step of casting a ray comprises performing a first ray cast operation through the point and into a graphics scene to determine a first intersecting object.

15. The non-transitory computer-readable storage medium of claim 14, wherein the step of casting a ray further comprises invoking at least one shader associated with the first intersecting object to render a first set of shading results, wherein the shader is associated with the first intersecting object based on a set of compositing rules.

16. The non-transitory computer-readable storage medium of claim 15, further comprising the step of pushing a first ray-tracing context associated with the first ray casting operation onto a memory stack.

17. The non-transitory computer-readable storage medium of claim 16, wherein the step of casting a ray comprises determining that a child ray should be cast and performing a second ray cast operation from the first intersecting object to a second intersecting object within the graphics scene to determine a second intersecting object.

18. The non-transitory computer-readable storage medium of claim 17, wherein the step of casting a ray further comprises invoking at least one shader associated with the second intersecting object to render a second set of shading results, wherein the shader is associated with the second intersecting object based on the set of compositing rules.

19. The non-transitory computer-readable storage medium of claim 18, further comprising the step of pushing a second ray-tracing context associated with the second ray cast operation onto the memory stack.

20. The non-transitory computer-readable storage medium of claim 19, further comprising the steps of determining that the second ray casting operation is complete and popping the second ray-tracing context from the memory stack.

21. The non-transitory computer-readable storage medium of claim 20, further comprising the steps of determining that the first ray trace operation is complete and popping the first ray-tracing context from the memory stack.

22. A non-transitory computer-readable storage medium including instructions that, when executed by a processing unit, cause the processing unit to render a plurality of pixels into a corresponding plurality of frame buffers for display, by performing the steps of:

selecting a point to render within a viewport, wherein the point represents a common location for each pixel within the frame buffer corresponding to the pixel;

initializing a plurality of data structures, wherein each data structure is associated with a different one of the frame buffers in the plurality of frame buffers and includes metadata that determines how data stored in the frame buffer associated with the data structure is generated and processed;

attaching each data structure to a ray-trace state associated with the point;

casting a ray based on the ray-trace state to render shading results;

storing the shading results in one or more compositinq stacks residing within the data structures;

generating one of more samples for each of the pixels based on the shading results;

combining the one or more samples for each of the pixels to generate the plurality of pixels; and storing each pixel in the frame buffer corresponding to the pixel.

* * * * *

UNITED STATES PATENT AND TRADEMARK OFFICE
CERTIFICATE OF CORRECTION

PATENT NO.         : 8,368,694 B2
APPLICATION NO.    : 12/478671
DATED              : February 5, 2013
INVENTOR(S)        : Justin Novosad It is certified that error appears in the above-identified patent and that said Letters Patent is hereby corrected as shown below:

Title Page, Assignee (73):

Please delete "Rafaelca" and insert -- Rafael, CA (US) -- therefor.

Signed and Sealed this
Twenty-third Day of April, 2013

Teresa Stanek Rea
*Acting Director of the United States Patent and Trademark Office*